March 21, 1944.                C. WOOD                2,344,580
                              FISH LURE
                         Filed Aug. 13, 1942
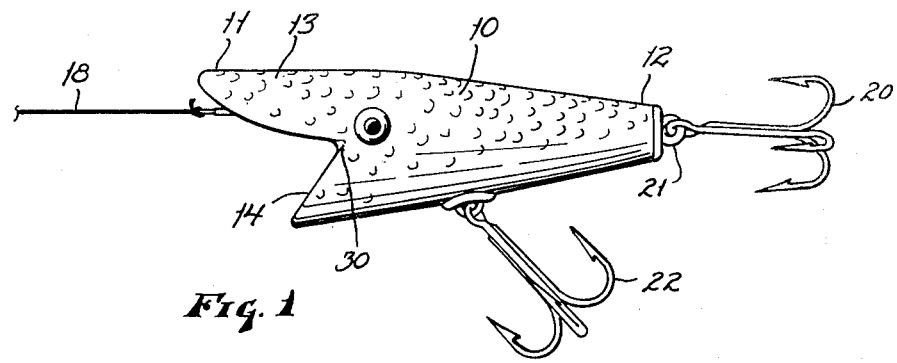
Fig. 1
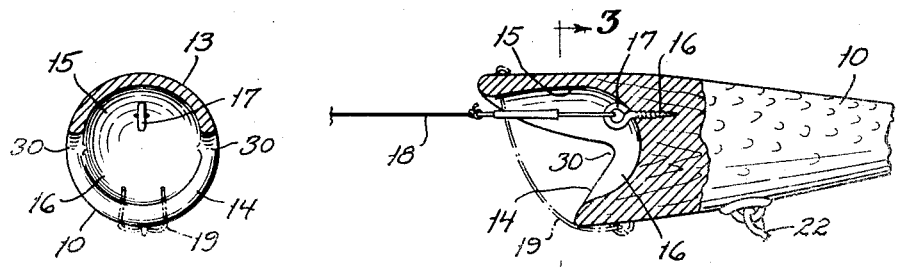
Fig. 3     Fig. 2
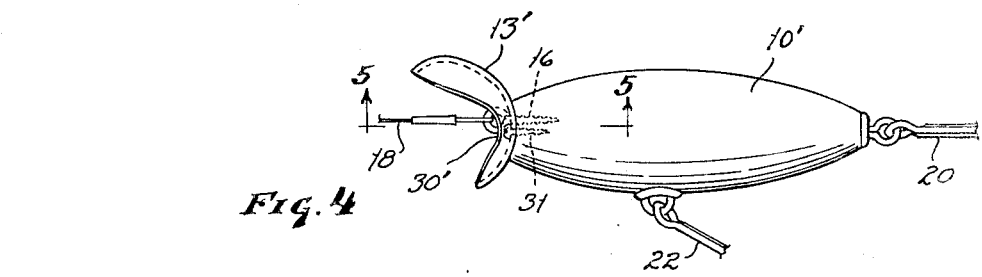
Fig. 4     Fig. 5
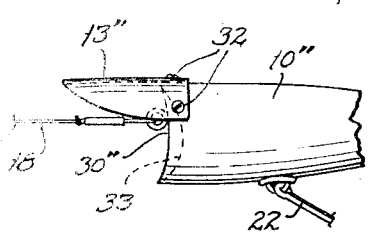
Fig. 6
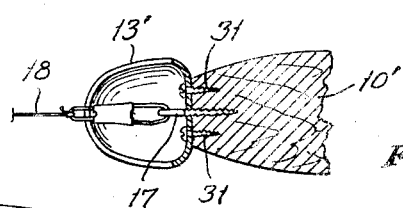
INVENTOR
Cowad Wood
BY
HIS ATTORNEY Patented Mar. 21, 1944

2,344,580

UNITED STATES PATENT OFFICE 2,344,580

FISH LURE

Conrad Wood, El Dorado, Ark., assignor to The American Fork & Hoe Company, Cleveland, Ohio, a corporation of Ohio Application August 13, 1942, Serial No. 454,735

5 Claims. (Cl. 43—46)

My invention relates to artificial lures and relates more particularly to that type of artificial lures commonly called "surface" lures.

It is an object of my invention to provide a surface lure of the type referred to which when drawn through the water will have a movement which is attractive to fish.

Another object of my invention is to provide a lure of the type referred to wherein any tendency of the lure to dive is overcome, the lure operating as a skimming surface lure.

Other objects of my invention and the invention itself will become more apparent by reference to the accompanying drawing and the following description.

In the drawing:

Fig. 1 is a side elevational view of a fish lure constructed in accordance with my invention;

Fig. 2 is a longitudinal sectional view of the lure of Fig. 1, a portion being broken away;

Fig. 3 is a view taken from the line 3—3 of Fig. 2;

Fig. 4 is a side elevational view of another embodiment of my invention;

Fig. 5 is a sectional view of the lure taken on the line 5—5 of Fig. 4; and

Fig. 6 is a side elevational view, partially in section, of another embodiment of my invention.

The lure of my invention, as exemplified by the embodiments shown in Figs. 1 to 2, inclusive, comprises a plug 10, of wood or other material, buoyant or otherwise, which is given a waterproof coat of lacquer or paint, the same being painted to simulate the body of a fish. The body 10 tapers from the front end 11 of said body to the tail portion 12 thereof and is provided at its forward end with a substantially long protruding upper jaw portion 13 said upper jaw being constructed in the form of my invention shown in Fig. 1 as an integral part of the lure, and in the forms of my invention disclosed in Figs. 4, 5 and 6 as additional or separate elements 13' and 13''.

It is to be noted that said upper jaw 13 is disposed a substantial distance forwardly of the lower jaw portion 14 of the lure as well as of the remainder of the lure body and that said bill portion 13 is generally formed inwardly concaved as shown at 15 in Fig. 2, whereby a generally arcuate hollowed-out portion is provided by said upper jaw 13 within which water may be received and such upper jaw is effective because of its formation and its length to ride on top of the water, breasting the same and acting always as a surface lure. The lower jaw portion, as is also shown in Fig. 2, is also provided with an arcuate depressed portion as shown at 16 and this said depressed portions forms a continuation of the arcuate hollowed-out portion of the upper jaw whereby an open inwardly concaved mouth is provided.

Screw means 16 provided with an eyelet 17 is anchored within the body of the lure adjacent the upper jaw portion whereby a lead line 18 may be affixed to said lure adjacent to its forward portion, being secured to said eye 17, and a wire guard 19 may further be provided upon said lure, if desired, to prevent the ingress of weeds or other matter. As shown, the lure body is further provided with rear gang hooks 20 swivably secured to said lure by an eyelet 21 disposed adjacent the rear or tail portion 12 of the lure and that gang hooks 22 are suspended in a similar manner beneath the central portion of the lure on the underside thereof, said hooks being swivably movable with respect to said lure.

In the form of my invention shown in Figs. 4 and 5, the separate element 13', which is utilized instead of the head portion which is illustrated in connection with Figs. 1 to 3, inclusive, comprises both bill portion and lower jaw, the same being formed of a single piece of metal which is bent to the form shown in the figures and secured to a wooden body portion 10' by means of screws threaded into said body portion, as shown at 31. Gang hooks similar to those employed in the form of my invention shown in Figs. 1 to 3, inclusive, are preferably utilized in connection with the lure of Figs. 4 and 5.

In the form of my invention shown in Fig. 6, the bill is a separable element and this is formed in a manner similar to a visor, being secured to the upper surface of the lure body 10'' by means of screws 32—32. The forward edge of the body portion 10'' is preferably formed with a depressed portion 33 which forms the jaw and mouth portion.

In use, when the lure is caused to assume a horizontal position in the water by a pull on the line, the long bill acts to keep the lure on top of the water, and when drawn through the water, the lure has a side to side movement and a slight rocking movement, the water entering the mouth being sprayed out of the side edges 30 and 30', the rocking movement causing a gurgling noise, which, together with the rocking and spraying action, has been found most attractive to fish.

Having described herein the preferred embodiments of my invention, it is to be understood that numerous and extensive departures may be made therefrom without departing from the spirit of my invention and the scope of the appended claims.

I claim:

1. An artificial bait including a body portion, a head portion comprising an upper jaw portion and a lower jaw portion, said jaws each being provided with a concave mouth portion, said upper jaw protruding a substantial distance forwardly of said lower jaw, the said upper jaw being substantially arcuate and constituting an extension of said body portion, the upper central surface of said upper jaw being substantially longitudinally disposed.

2. A surface lure comprising a body portion having a substantially long bill portion, said bill portion protruding a substantial distance forwardly from the body portion and in the plane of the upper surface of the body portion, said bill being generally formed inwardly concave and providing a portion within which, when the lure is in use, water may be received, said bill being adapted to ride on top of the water and to breast the same.

3. A surface lure comprising a body portion of generally tapered form, the body tapering from the forward edge of the same to the tail portion and being provided at its forward end with a substantially long outwardly protruding upper jaw portion disposed in the plane of the upper surface of the lure, said upper jaw portion being arcuate in form and having an inwardly concave portion, said body portion being provided at its forward lower end portion with a lower jaw, said lower jaw portion being also provided with an inwardly concave portion and disposed rearwardly of the mid-portion of the upper jaw.

4. A surface lure comprising a body portion of generally tapered form, the body tapering from the forward edge of the same to the tail portion and being provided at its forward end with a substantially long outwardly protruding upper jaw portion disposed in the plane of the upper surface of the lure, said upper jaw portion being arcuate in form and having an inwardly concave portion, said body portion being provided at its forward lower end portion with a lower jaw, said lower jaw portion being inclined at an angle to said body portion and also being provided with an inwardly concave portion and disposed rearwardly of the mid-portion of the upper jaw.

5. An artificial bait including a body portion, a head portion comprising an upper jaw portion and a lower jaw portion, said upper jaw portion being substantially longer than said lower jaw portion and extending forwardly of the body, and said lower jaw portion disposed downwardly and forwardly of the jointure thereof, each of said jaw portions having substantial hollowed out portions, said hollowed out portion of said upper jaw extending inwardly from approximately the most forward uppermost portion of the lure and constituting an extension of the hollowed out portion of the lower jaw.

CONRAD WOOD.